US012421886B2

(12) United States Patent
Onoue et al.

(10) Patent No.: US 12,421,886 B2
(45) Date of Patent: Sep. 23, 2025

(54) OUTBOARD MOTOR

(71) Applicant: YAMAHA HATSUDOKI KABUSHIKI KAISHA, Iwata (JP)

(72) Inventors: Junya Onoue, Shizuoka (JP); Hiroki Koga, Shizuoka (JP); Yoshiyuki Kadobayashi, Shizuoka (JP); Kimitaka Saruwatari, Shizuoka (JP); Akihiro Noma, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 269 days.

(21) Appl. No.: 17/987,112

(22) Filed: Nov. 15, 2022

(65) Prior Publication Data

US 2023/0313729 A1 Oct. 5, 2023

(30) Foreign Application Priority Data

Apr. 1, 2022 (JP) ................................ 2022-062043

(51) Int. Cl.
*F02B 61/00* (2006.01)
*F01P 3/20* (2006.01)
*F02B 61/04* (2006.01)

(52) U.S. Cl.
CPC ............ *F01P 3/202* (2013.01); *F02B 61/045* (2013.01)

(58) Field of Classification Search
CPC .......... F01P 2005/105; F01P 5/12; F01P 5/10; F01P 3/202; F01P 2050/02; F01P 2050/12; F01P 5/04; F02B 61/045
USPC ............................................ 440/88 C, 88 P
See application file for complete search history.

(56) References Cited

U.S. PATENT DOCUMENTS

2010/0112877 A1* 5/2010 McChesney ............ F01P 3/202 440/88 R
2011/0195620 A1* 8/2011 Davis ..................... B63H 20/14 440/75
2015/0367925 A1* 12/2015 Oguma .................. B63H 20/20 440/88 P
2016/0076531 A1* 3/2016 Yoshitani ................ F04B 49/06 123/41.12
2020/0370462 A1* 11/2020 Saruwatari ............. B63H 20/28

FOREIGN PATENT DOCUMENTS

JP 2015-067191 A 4/2015

* cited by examiner

*Primary Examiner* — Lindsay M Low
*Assistant Examiner* — Teuta B Holbrook
(74) *Attorney, Agent, or Firm* — Keating & Bennett, LLP

(57) ABSTRACT

An outboard motor includes a bracket, an engine, an upper case, a lower case, a cavitation plate, a transmission, a cooling water passage, a first pump, and a second pump. The transmission includes a drive shaft and a propeller shaft. The cooling water passage is connected to the engine and located in the upper case and the lower case. The first pump is below a lower end of the bracket. The first pump is connected to the transmission and operable to send cooling water to the engine through the cooling water passage. The first pump is a non-positive displacement pump. The second pump is driven by a driving force from the transmission and operable to send the cooling water to the engine through the cooling water passage.

20 Claims, 21 Drawing Sheets

OUTBOARD MOTOR

CROSS-REFERENCE TO RELATED APPLICATION

This application claims priority to Japanese Patent Application No. 2022-62043, filed on Apr. 1, 2022. The contents of this application are hereby incorporated by reference herein in their entirety.

BACKGROUND OF THE INVENTION

1. Field of the Invention

The present invention relates to an outboard motor.

2. Description of the Related Art

An outboard motor includes a water pump and a cooling water passage for supplying cooling water to the engine. A water intake is provided at the bottom of the outboard motor, and the cooling water passage is connected to the engine and the water intake. The water pump delivers the cooling water to the engine through the cooling water passage.

On the other hand, as disclosed in JP-A-2015-67191, some outboard motors include a main pump and a sub-pump. The sub-pump sends cooling water to the main pump, and the main pump sends the cooling water to the engine. In the outboard motor disclosed in JP-A-2015-67191, the main pump is disposed in the upper case. The main pump is driven by an electric motor. The sub-pump is arranged in the lower case. The sub-pump is driven by the rotation of the drive shaft.

When the main pump is driven by an electric motor as in the above outboard motor, a space is required in the outboard motor for arranging the electric motor. As a result, the size of the outboard motor is increased.

SUMMARY OF THE INVENTION

Preferred embodiments of the present invention provide outboard motors that each efficiently supply cooling water to an engine using a plurality of pumps while reducing a size of the outboard motor.

An outboard motor according to a preferred embodiment of the present invention includes a bracket, an engine, an upper case, a lower case, a cavitation plate, a transmission, a cooling water passage, a first pump, and a second pump. The bracket is attached to a watercraft. The upper case is below the engine. The lower case is below the upper case. The cavitation plate is connected to the lower case. The transmission includes a drive shaft and a propeller shaft. The drive shaft extends downward from the engine and is located in the upper case and the lower case. The propeller shaft is connected to the drive shaft, extends in the front-rear direction of the outboard motor, and is located in the lower case. The cooling water passage is connected to the engine and located in the upper case and the lower case. The first pump is below a lower end of the bracket. The first pump is connected to the transmission and operable to send cooling water to the engine through the cooling water passage. The first pump is a non-positive displacement pump. The second pump is driven by the driving force from the transmission and operable to send cooling water to the engine through the cooling water passage.

In an outboard motor according to a preferred embodiment of the present invention, the cooling water is efficiently sent to the engine by the first pump and the second pump. The first pump is connected to the transmission and driven by the transmission. Therefore, the outboard motor is smaller than when the first pump is driven by an electric motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
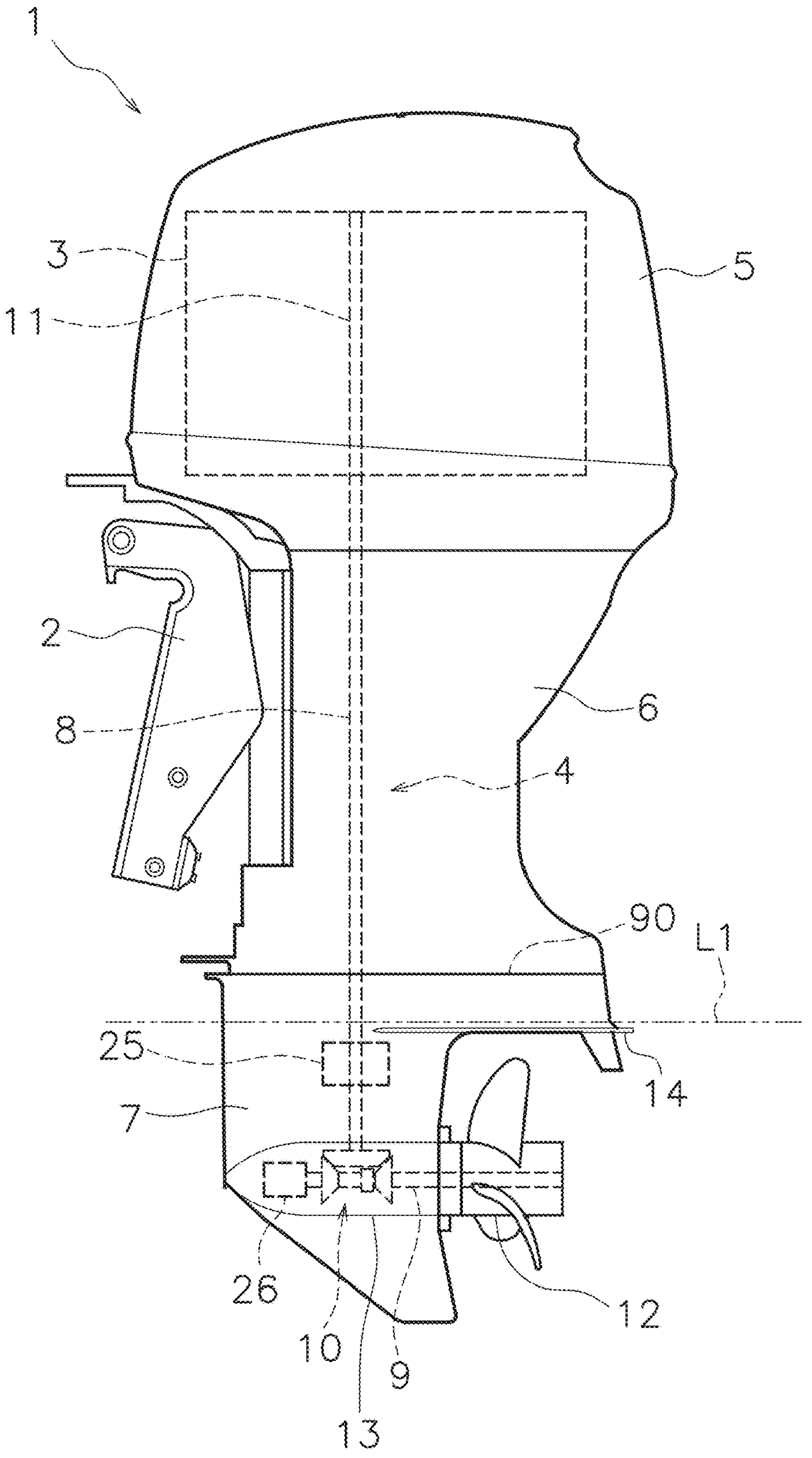
FIG. 1 is a side view of an outboard motor according to a first preferred embodiment of the present invention.

Preferred embodiments will be described below with reference to the drawings. FIG. 1 is a side view of an outboard motor 1 according to a first preferred embodiment of the present invention. The outboard motor 1 includes a bracket 2, an engine 3, a transmission mechanism 4, an engine cowl 5, an upper case 6, and a lower case 7. The outboard motor 1 is attached to the watercraft via the bracket 2.

The engine 3 generates thrust to propel the watercraft. The engine 3 includes a crankshaft 11. The crankshaft 11 extends in the vertical direction of the outboard motor 1. The transmission mechanism 4 transmits the driving force of the engine 3 to a propeller 12. The transmission mechanism 4 includes a drive shaft 8, a propeller shaft 9, and a shift mechanism 10. The drive shaft 8 is connected to the crankshaft 11. The drive shaft 8 extends in the vertical direction of the outboard motor 1. The drive shaft 8 extends downward from the engine 3.

The propeller shaft 9 extends in the front-rear direction of the outboard motor 1. The propeller shaft 9 is connected to the drive shaft 8 via the shift mechanism 10. The propeller 12 is attached to the propeller shaft 9. The shift mechanism 10 includes a plurality of gears and a clutch. The shift mechanism 10 switches the transmission direction of the rotation from the drive shaft 8 to the propeller shaft 9. As a result, the watercraft is switched between forward and reverse.

The engine 3 is disposed in the engine cowl 5. The upper case 6 is disposed below the engine 3. The lower case 7 is disposed below the upper case 6. The drive shaft 8 is disposed in the upper case 6 and the lower case 7. The propeller shaft 9 and the shift mechanism 10 are disposed in the lower case 7. Specifically, the lower case 7 includes a torpedo portion 13. The torpedo portion 13 has an outwardly bulging shape. The propeller shaft 9 and the shift mechanism 10 are disposed in the torpedo portion 13. A cavitation plate 14 is connected to the lower case 7. The cavitation plate 14 protrudes rearward from the lower case 7.

Figure 2:
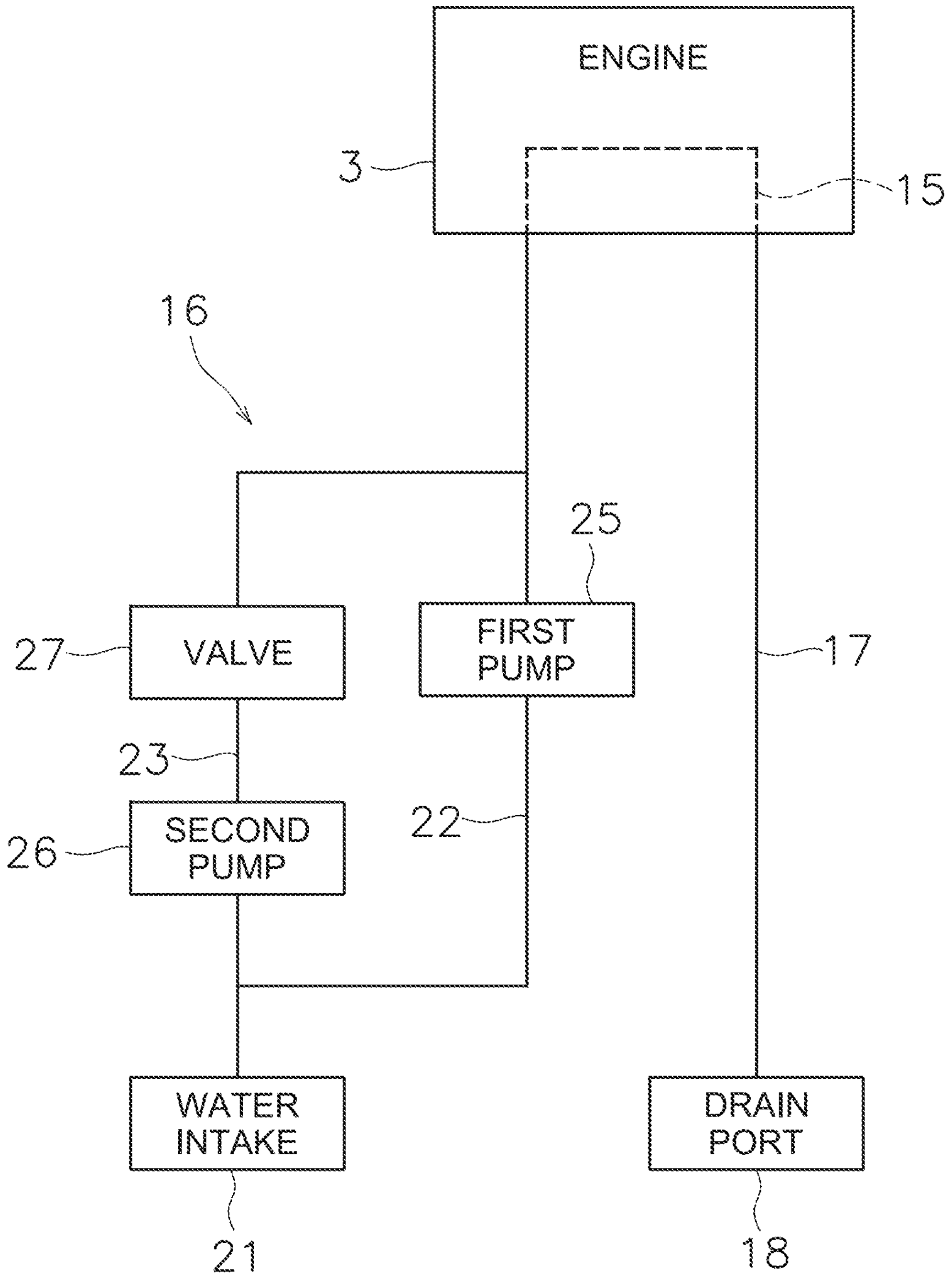
FIG. 2 is a block diagram showing a cooling system of an outboard motor.

FIG. 2 is a block diagram showing a cooling system of the outboard motor 1. As shown in FIG. 2, the engine 3 includes a water jacket 15. The cooling water flowing through the water jacket 15 cools the engine 3. The outboard motor 1 includes a cooling water passage 16 and a drain passage 17. The cooling water passage 16 and the drain passage 17 are connected to the water jacket 15 of the engine 3. The cooling water passage 16 and the drain passage 17 are disposed in the upper case 6 and the lower case 7.

The cooling water is supplied from the outside of the outboard motor 1 to the water jacket 15 of the engine 3 through the cooling water passage 16. The cooling water is discharged from the water jacket 15 to the outside of the outboard motor 1 through the drain passage 17 and a drain port 18. The drain port 18 is provided in the lower case 7, for example. Alternatively, the drain port 18 may be provided in the upper case 6.

The cooling water passage 16 includes a water intake 21, a first passage 22, and a second passage 23. The outboard motor 1 includes a first pump 25, a second pump 26, and a valve 27. The water intake 21 is provided in the lower case 7. The water intake 21 communicates with the outside of the outboard motor 1. The cooling water is drawn into the cooling water passage 16 from the outside of the outboard motor 1 through the water intake 21.

The first passage 22 is connected to the water intake 21. The first pump 25 is provided in the first passage 22. The second passage 23 is connected to the water intake 21. The second pump 26 is provided in the second passage 23. The valve 27 is provided in the second passage 23. The valve 27 allows the cooling water to flow from the second passage 23 to the first passage 22. The valve 27 inhibits the flow of the cooling water from the first passage 22 to the second passage 23.

The first passage 22 and the second passage 23 are connected to the water jacket 15. The first pump 25 sends the cooling water to the engine 3 through the first passage 22. The second pump 26 sends the cooling water to the engine 3 through the second passage 23.

As shown in FIG. 1, the first pump 25 is disposed coaxially with the drive shaft 8. The first pump 25 is connected to the drive shaft 8. The first pump 25 is driven by the rotation of the drive shaft 8. The first pump 25 is disposed below the lower end of the bracket 2. The first pump 25 is disposed in the lower case 7. The first pump 25 is disposed below the cavitation plate 14. The first pump 25 is disposed below the waterline L1 where the watercraft is stopped.

The second pump 26 is disposed in the lower case 7. The second pump 26 is disposed below the first pump 25. The second pump 26 is disposed below the cavitation plate 14. The second pump 26 is disposed below the waterline L1 when the watercraft is stopped. The second pump 26 is disposed in the torpedo portion 13.

The second pump 26 is connected to the propeller shaft 9. The second pump 26 is coaxial with the propeller shaft 9. The second pump 26 is driven by the rotation of the propeller shaft 9. The first pump 25 is a non-positive displacement pump such as a centrifugal pump or an axial pump. The second pump 26 is a positive displacement pump such as a gear pump or a vane pump.

In the outboard motor 1 according to the present preferred embodiment, when the engine 3 is started, the first pump 25 is driven by the rotation of the drive shaft 8. The first pump 25 sends the cooling water from the water intake 21 to the water jacket 15 of the engine 3 through the first passage 22. Further, the rotation of the propeller shaft 9 drives the second pump 26. Thus, the second pump 26 sends the cooling water from the water intake 21 to the water jacket 15 of the engine 3 through the second passage 23.

In the outboard motor 1 according to the present preferred embodiment, the cooling water is sent to the engine 3 by the first pump 25 and the second pump 26. Thus, the cooling water is sent to the engine 3 efficiently. Also, the first pump 25 is connected to the drive shaft 8 and driven by the rotation of the drive shaft 8. Therefore, the size of the outboard motor 1 is reduced compared to when an electric motor that drives the first pump 25 is provided.

Although a preferred embodiment of the present invention has been described above, the present invention is not limited to the above preferred embodiment, and various modifications are possible without departing from the gist of the present invention.

Figure 3:
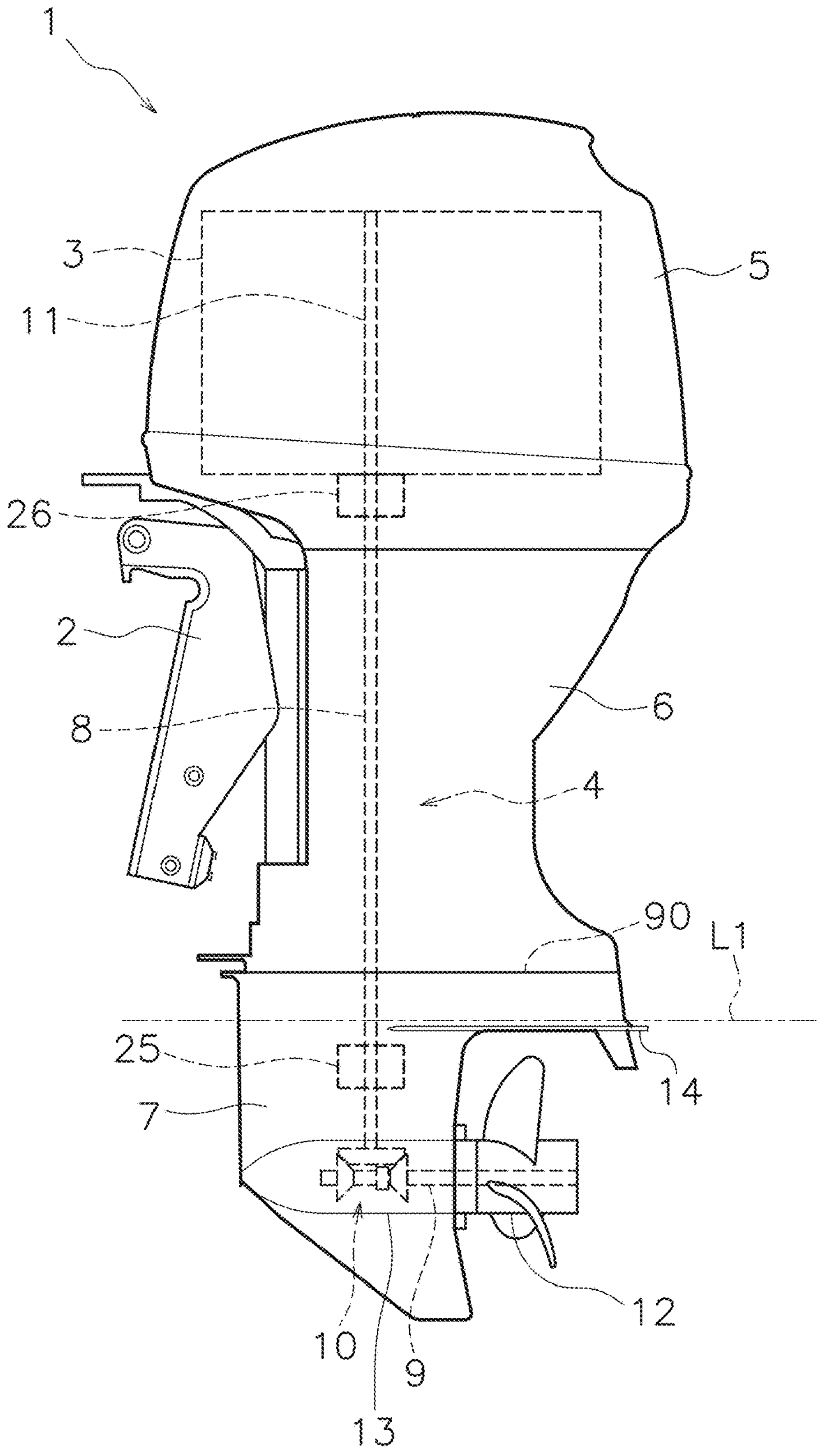
FIG. 3 is a side view of an outboard motor according to a second preferred embodiment of the present invention.

The arrangement of the first pump 25 and the second pump 26 is not limited to that of the first preferred embodiment, and may be changed. For example, the second pump 26 may be disposed above the cavitation plate 14. FIG. 3 is a side view of the outboard motor 1 according to a second preferred embodiment of the present invention. As shown in FIG. 3, in the outboard motor 1 according to the second preferred embodiment, the second pump 26 is connected to the crankshaft 11. The second pump 26 is disposed in the engine cowl 5. Alternatively, the second pump 26 may be disposed in the upper case 6.

Figure 4:
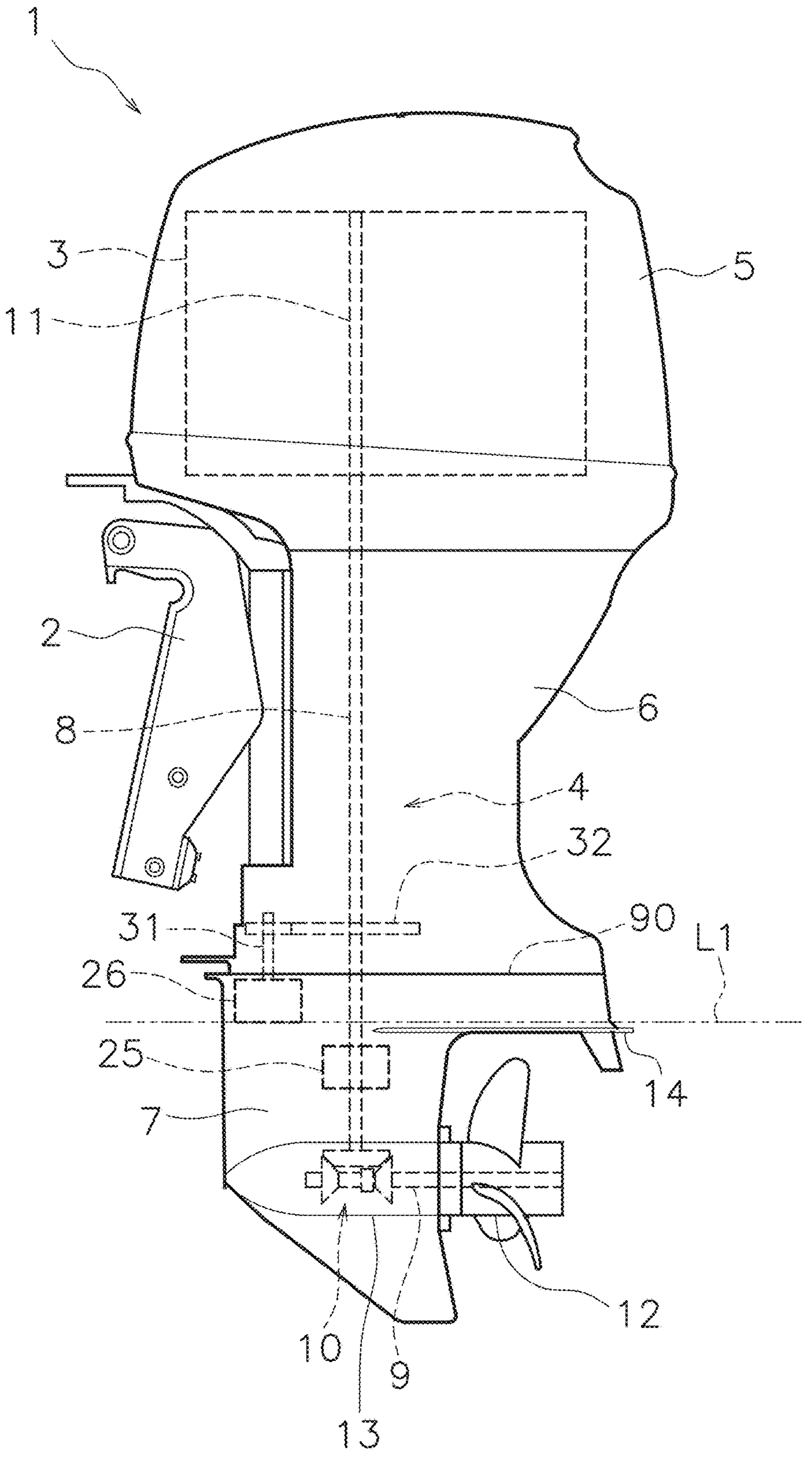
FIG. 4 is a side view of an outboard motor according to a third preferred embodiment of the present invention.

FIG. 4 is a side view of the outboard motor 1 according to a third preferred embodiment of the present invention. As shown in FIG. 4, in the outboard motor 1 according to the third preferred embodiment, the transmission mechanism 4 includes an intermediate shaft 31 and a link mechanism 32. The intermediate shaft 31 is disposed eccentrically with respect to the drive shaft 8, i.e., offset from the drive shaft 8. The intermediate shaft 31 is connected to the drive shaft 8 via the link mechanism 32 such as gears or a belt. The second pump 26 is coaxial with the intermediate shaft 31. The second pump 26 is connected to the intermediate shaft 31. The second pump 26 is disposed above the cavitation plate 14 in the lower case 7.

Figure 5:
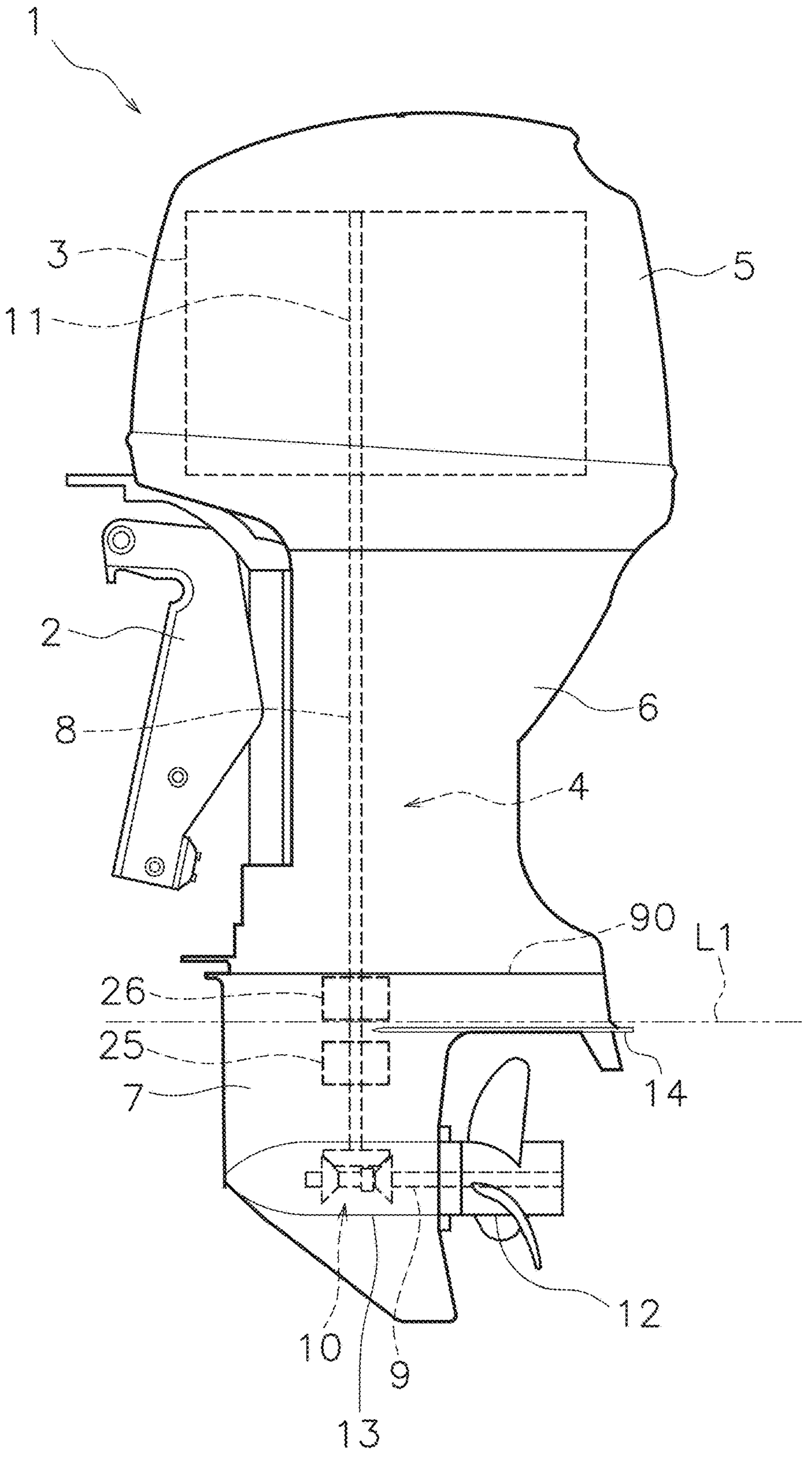
FIG. 5 is a side view of an outboard motor according to a fourth preferred embodiment of the present invention.

FIG. 5 is a side view of the outboard motor 1 according to a fourth preferred embodiment of the present invention. The second pump 26 may be connected to the drive shaft 8, as shown in FIG. 5. In the outboard motor 1 according to the fourth preferred embodiment, the second pump 26 is coaxial with the drive shaft 8. The second pump 26 is disposed above the cavitation plate 14. The second pump 26 is disposed above the first pump 25.

Figure 6:
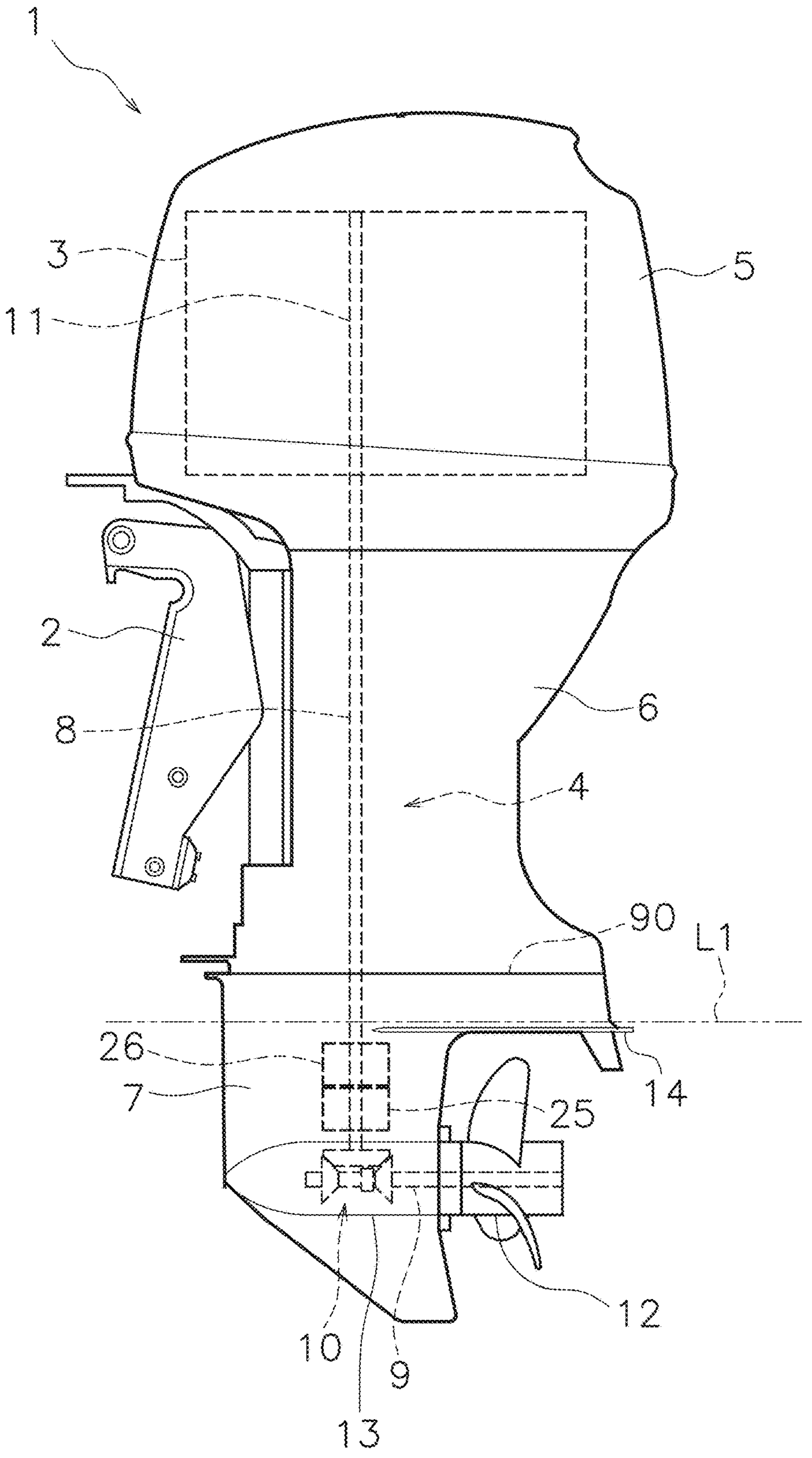
FIG. 6 is a side view of an outboard motor according to a fifth preferred embodiment of the present invention.

FIG. 6 is a side view of the outboard motor 1 according to a fifth preferred embodiment of the present invention. As shown in FIG. 6, in the outboard motor 1 according to the fifth preferred embodiment, the second pump 26 is disposed below the lower end of the bracket 2. The second pump 26 is disposed below the cavitation plate 14. The second pump 26 is coaxial with the drive shaft 8. The second pump 26 is connected to the drive shaft 8.

Figure 7:
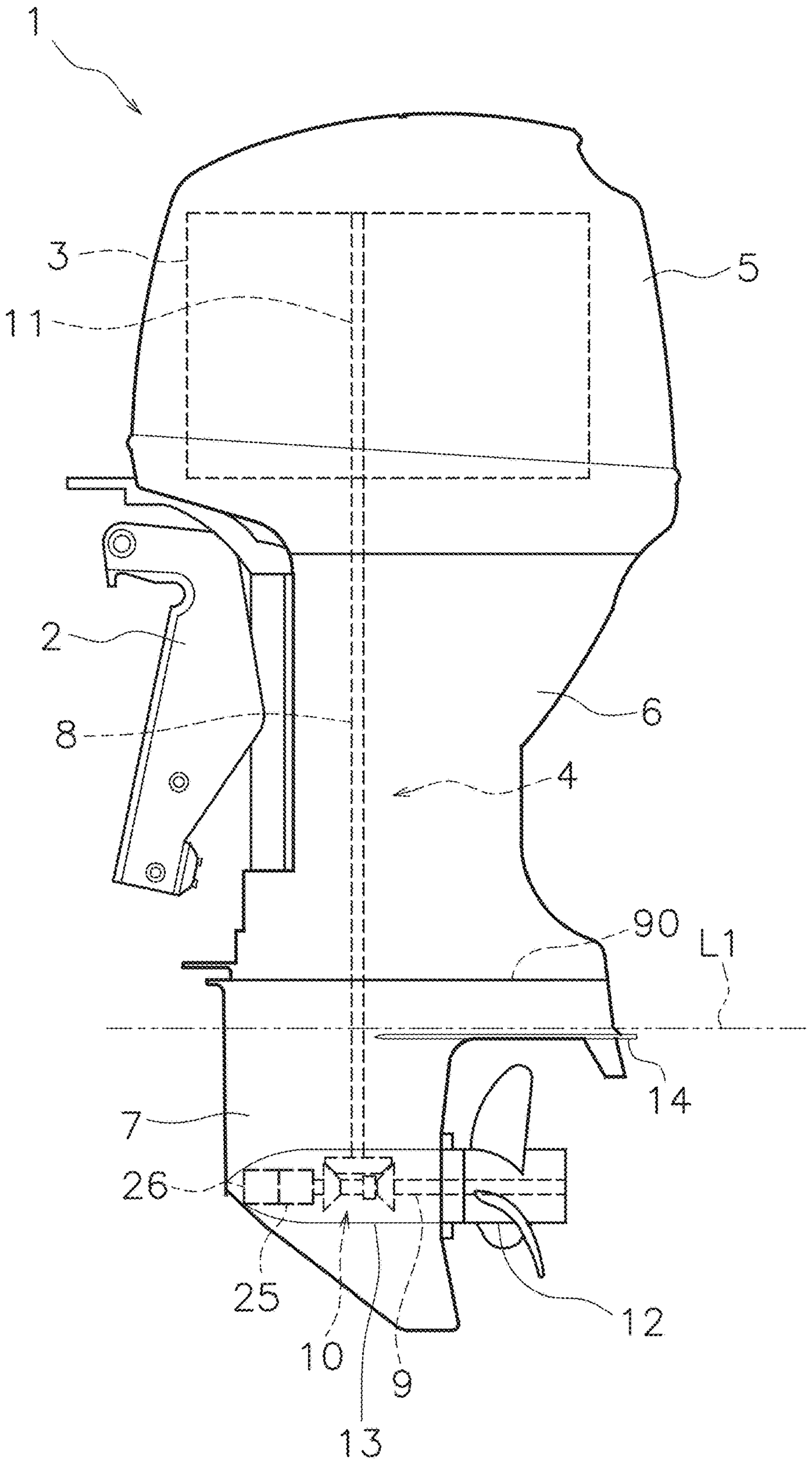
FIG. 7 is a side view of an outboard motor according to a sixth preferred embodiment of the present invention.

The first pump 25 may be connected not only to the drive shaft 8 but also to the propeller shaft 9. For example, FIG. 7 is a side view of the outboard motor 1 according to a sixth preferred embodiment of the present invention. As shown in FIG. 7, in the outboard motor 1 according to the sixth preferred embodiment, the first pump 25 is connected to the propeller shaft 9 in the torpedo portion 13. The first pump 25 is disposed side by side with the second pump 26 in the front-rear direction. The arrangement of the second pump 26 is the same as in the first preferred embodiment.

Figure 8:
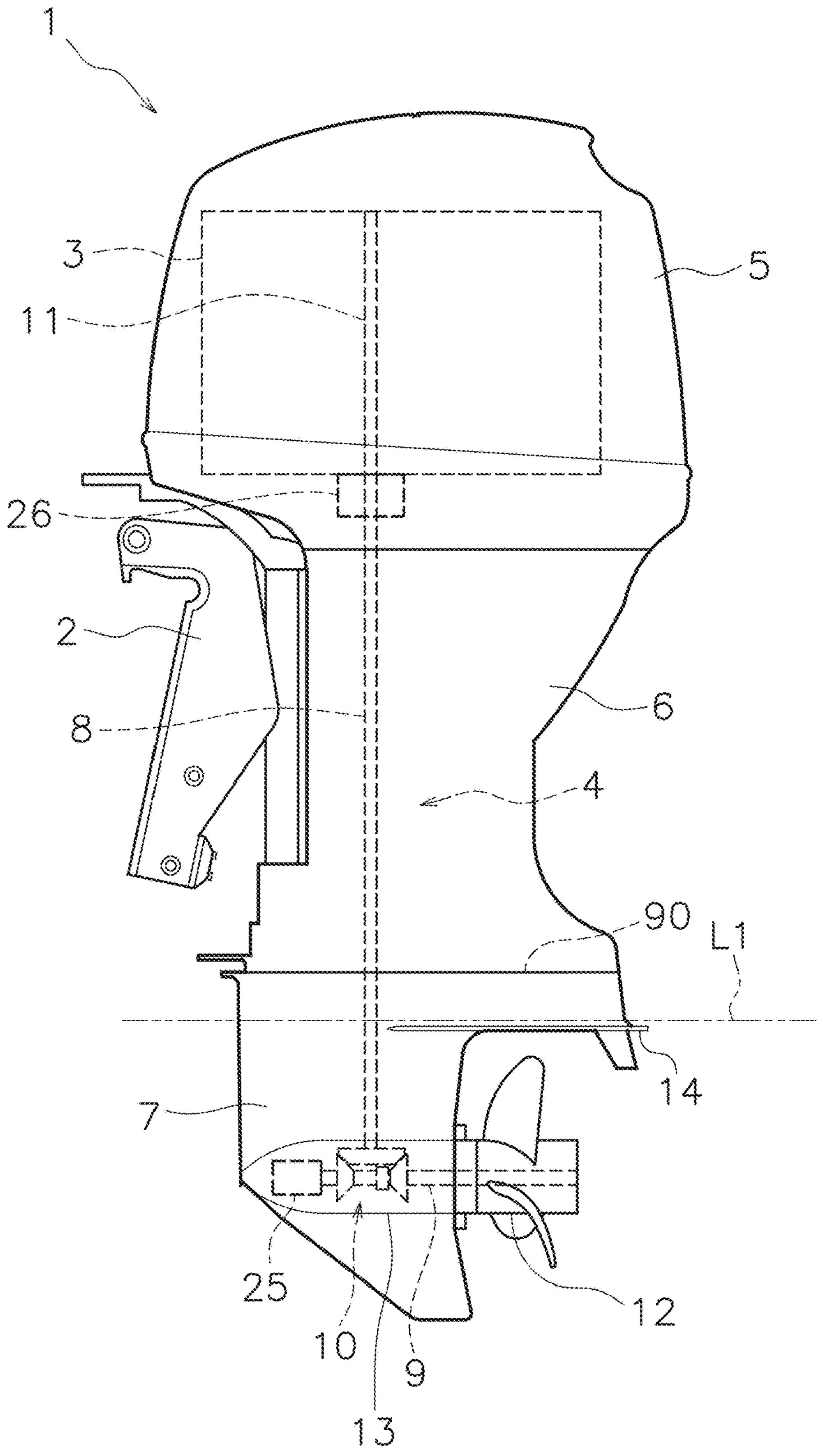
FIG. 8 is a side view of an outboard motor according to a seventh preferred embodiment of the present invention.

FIG. 8 is a side view of the outboard motor 1 according to a seventh preferred embodiment of the present invention. The first pump 25 is connected to the propeller shaft 9 in the outboard motor 1 according to the seventh preferred embodiment. The arrangement of the second pump 26 is the same as in the second preferred embodiment.

Figure 9:
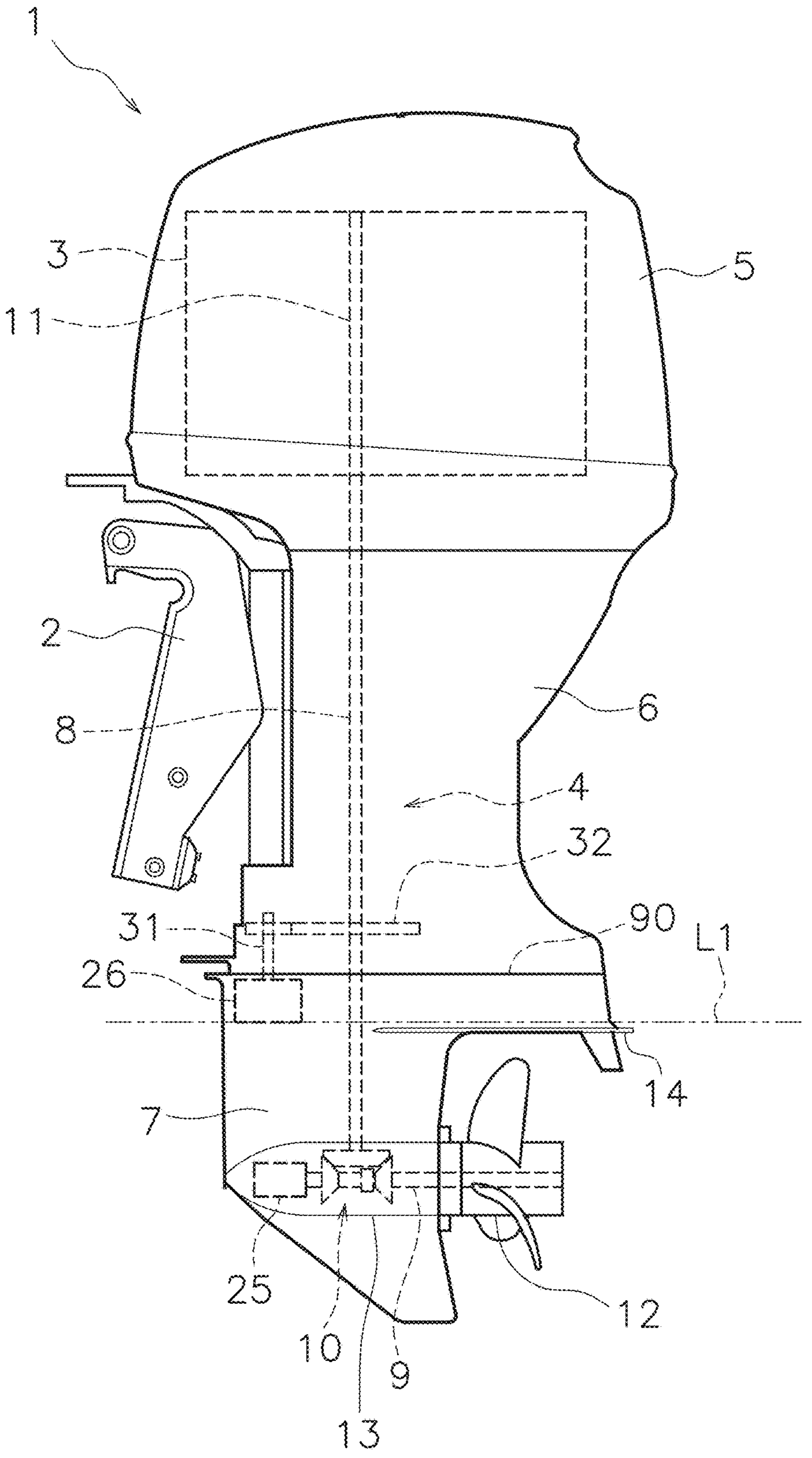
FIG. 9 is a side view of an outboard motor according to an eighth preferred embodiment of the present invention.

FIG. 9 is a side view of the outboard motor 1 according to an eighth preferred embodiment of the present invention. The first pump 25 is connected to the propeller shaft 9 in the outboard motor 1 according to the eighth preferred embodiment. The arrangement of the second pump 26 is the same as the third preferred embodiment.

Figure 10:
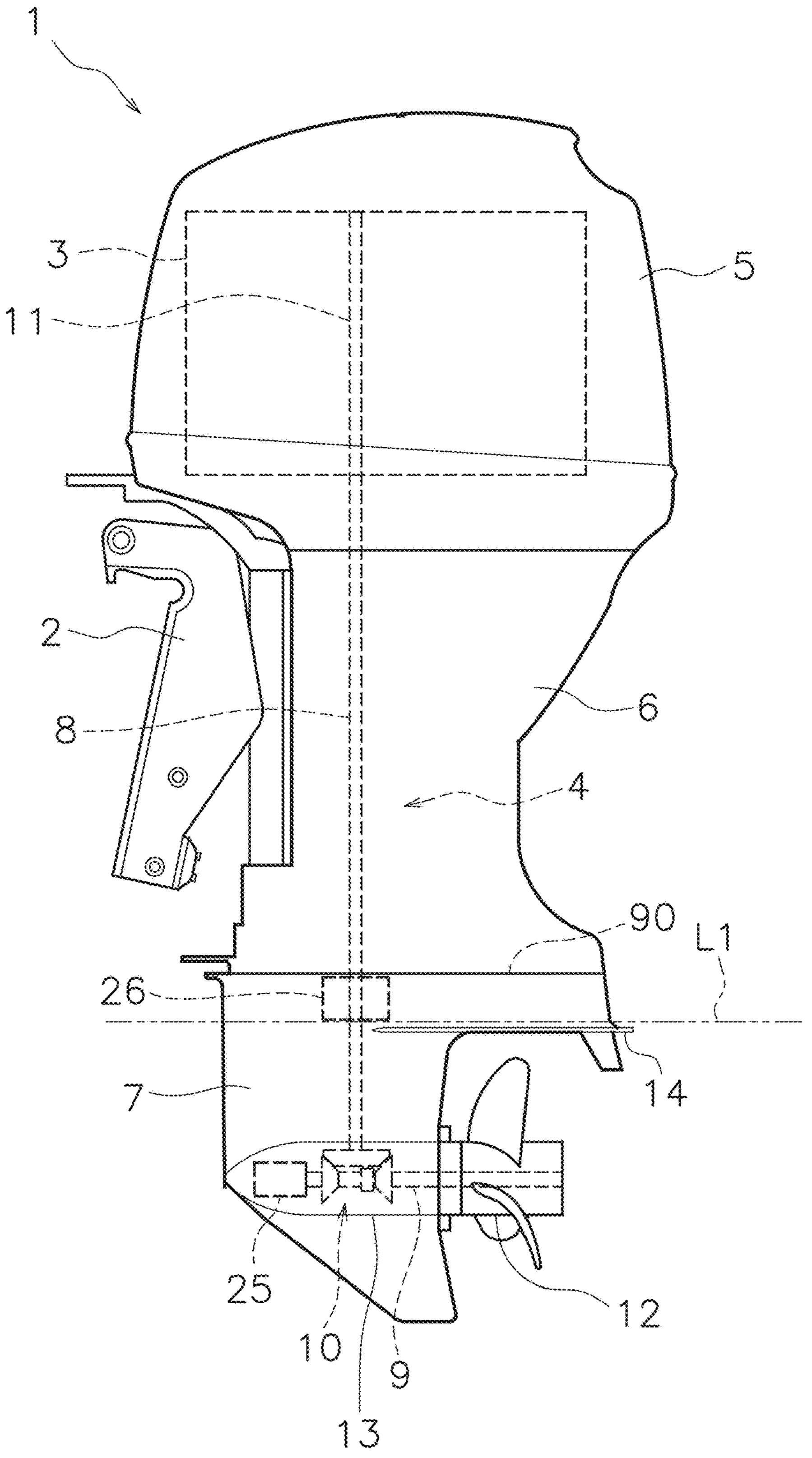
FIG. 10 is a side view of an outboard motor according to a ninth preferred embodiment of the present invention.

FIG. 10 is a side view of the outboard motor 1 according to a ninth preferred embodiment of the present invention. The first pump 25 is connected to the propeller shaft 9 in the outboard motor 1 according to the ninth preferred embodiment. The arrangement of the second pump 26 is the same as the fourth preferred embodiment.

Figure 11:
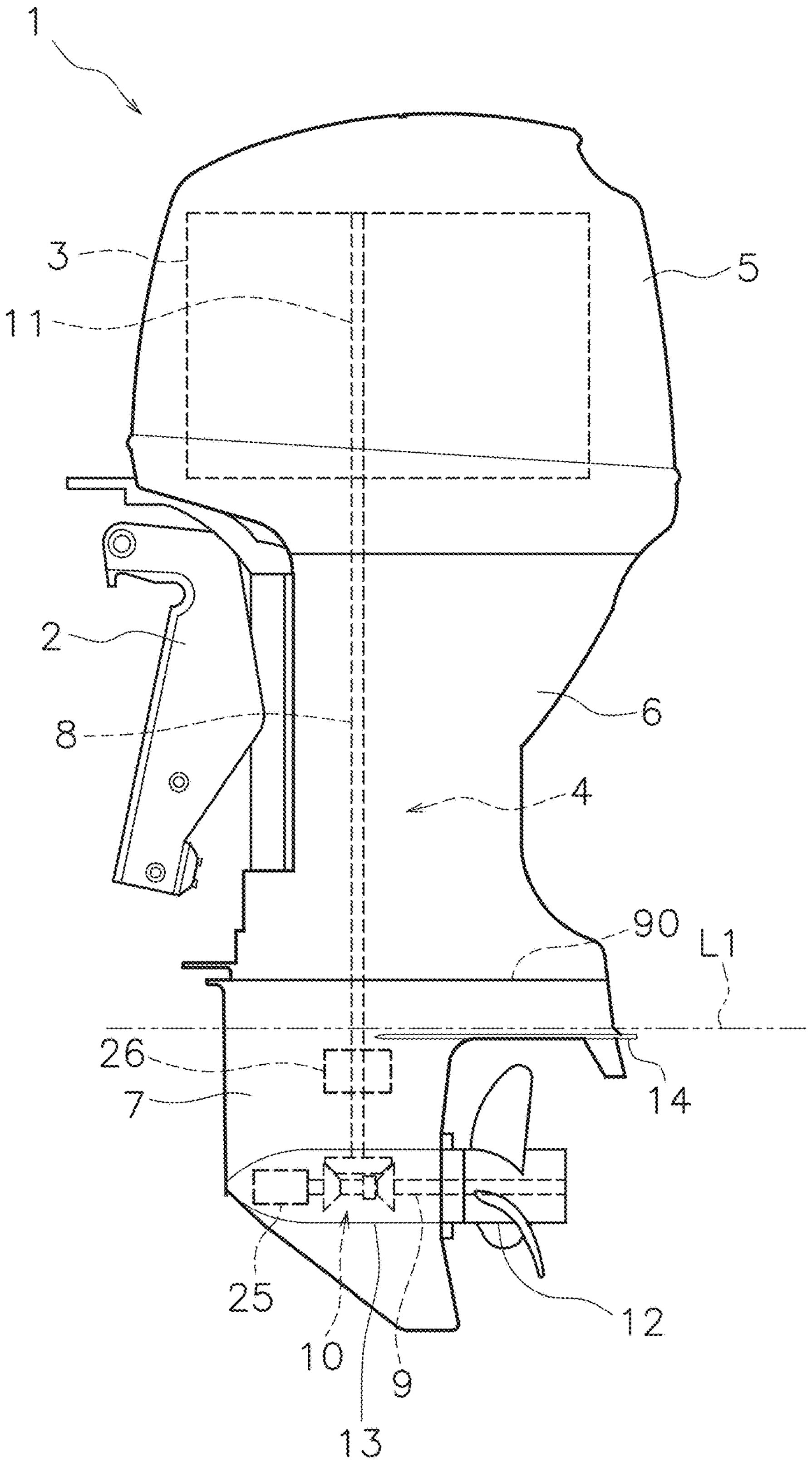
FIG. 11 is a side view of an outboard motor according to a tenth preferred embodiment of the present invention.

FIG. 11 is a side view of the outboard motor 1 according to a tenth preferred embodiment of the present invention. The first pump 25 is connected to the propeller shaft 9 in the outboard motor 1 according to the tenth preferred embodiment. The arrangement of the second pump 26 is the same as the fifth preferred embodiment.

Figure 12:
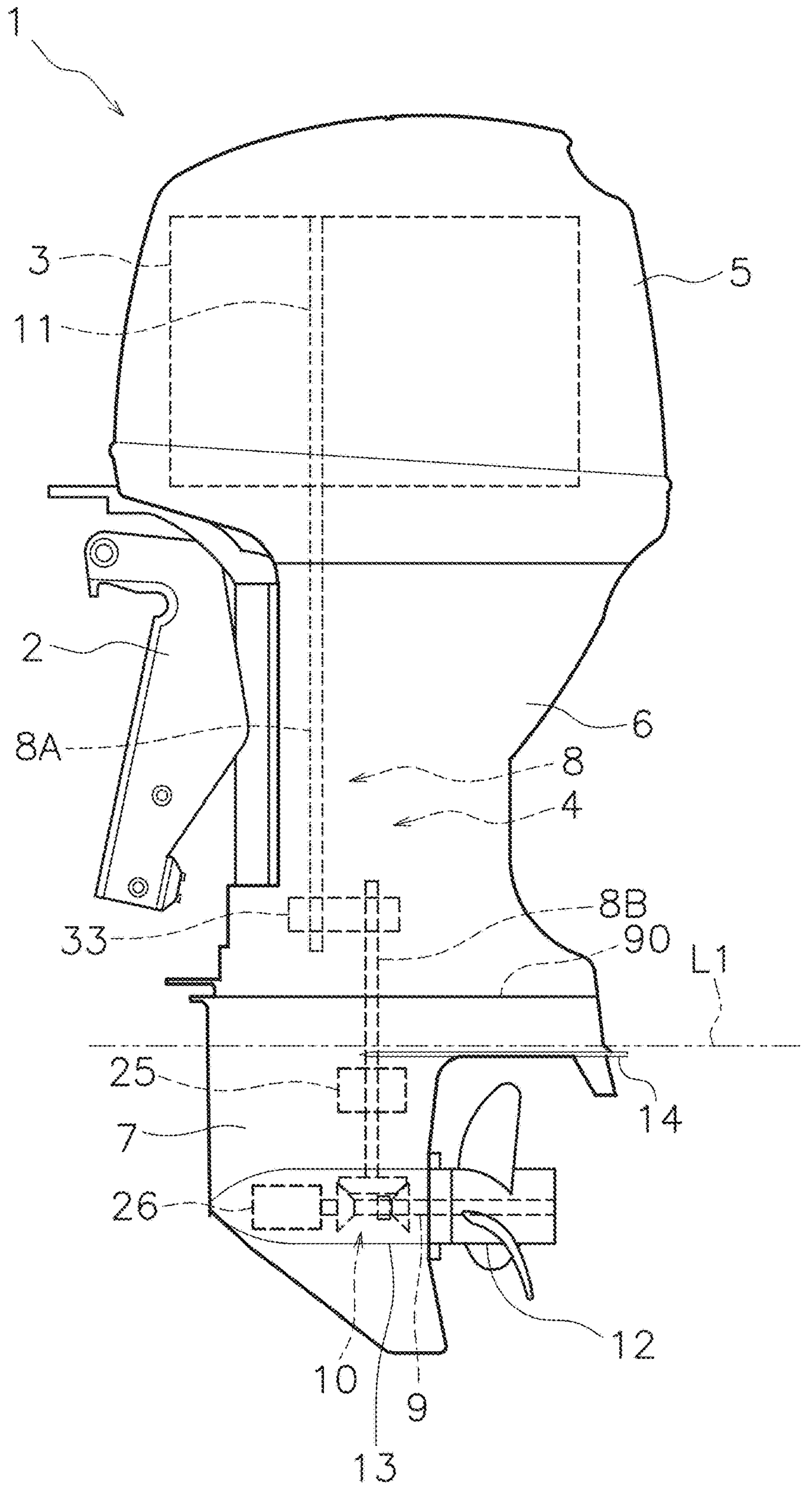
FIG. 12 is a side view of an outboard motor according to an eleventh preferred embodiment of the present invention.

The configuration of the transmission mechanism 4 is not limited to that of the above preferred embodiments, and may be modified. For example, FIG. 12 is a side view of the outboard motor 1 according to an eleventh preferred embodiment of the present invention. As shown in FIG. 12, in the outboard motor 1 according to the eleventh preferred embodiment, the drive shaft 8 includes a first drive shaft 8A and a second drive shaft 8B. The first drive shaft 8A is connected to the crankshaft 11. The second drive shaft 8B is connected to the propeller shaft 9 via the shift mechanism 10. The first drive shaft 8A and the second drive shaft 8B are offset from each other. The transmission mechanism 4 includes a link mechanism 33. The second drive shaft 8B is connected to the first drive shaft 8A via the link mechanism 33 such as gears or a belt.

Figure 13:
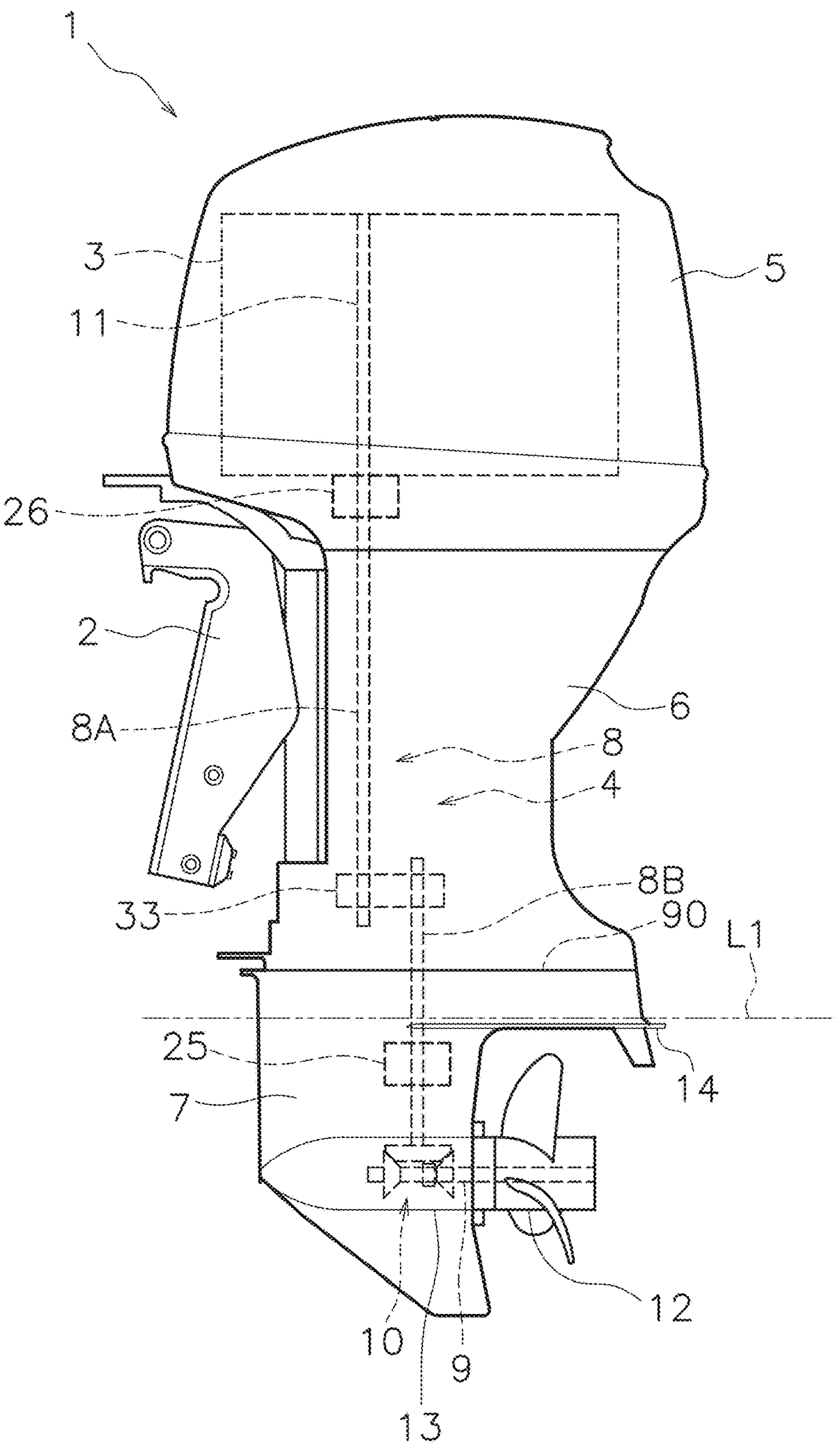
FIG. 13 is a side view of an outboard motor according to a twelfth preferred embodiment of the present invention.
Figure 14:
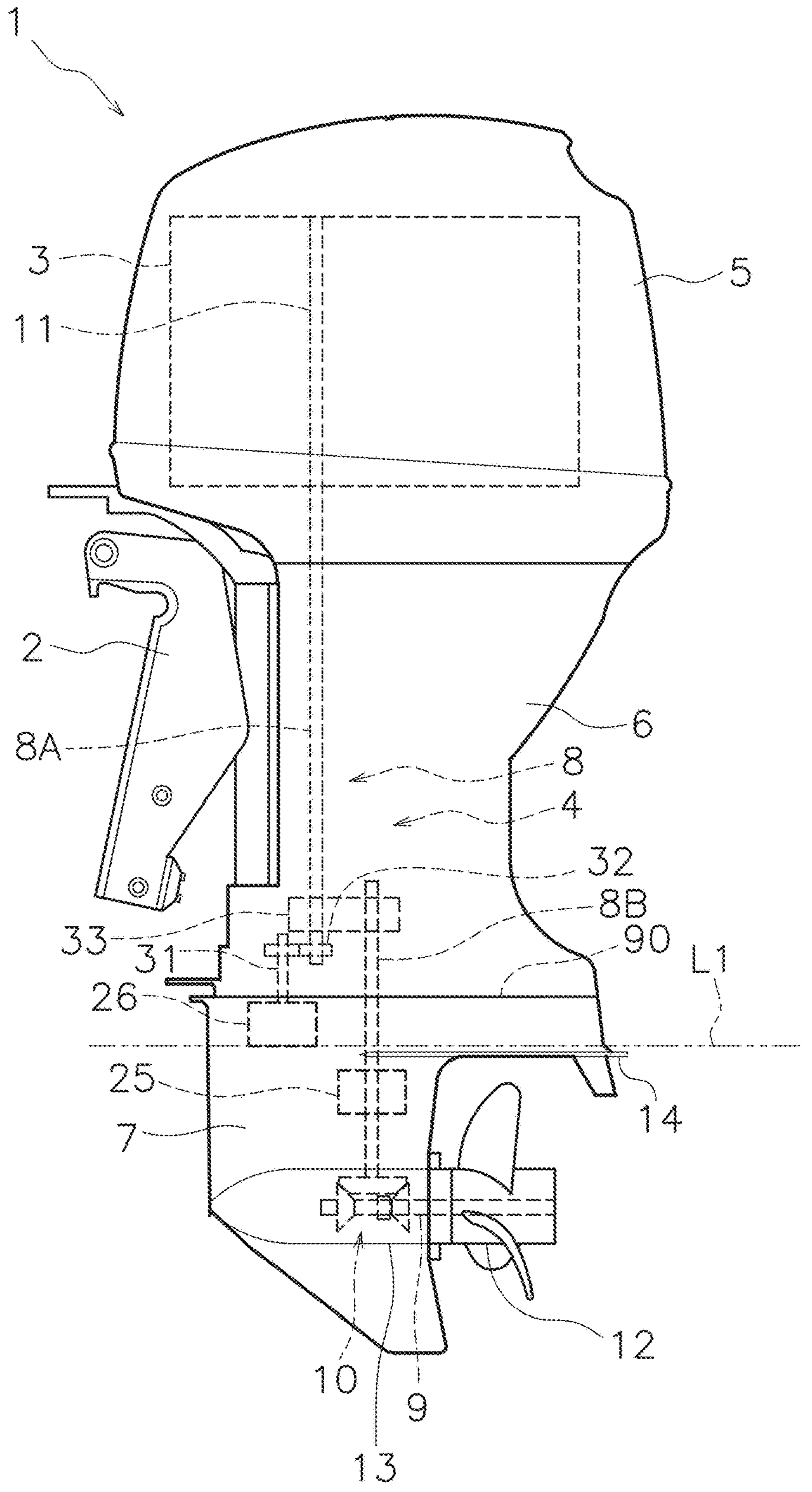
FIG. 14 is a side view of an outboard motor according to a thirteenth preferred embodiment of the present invention.
Figure 15:
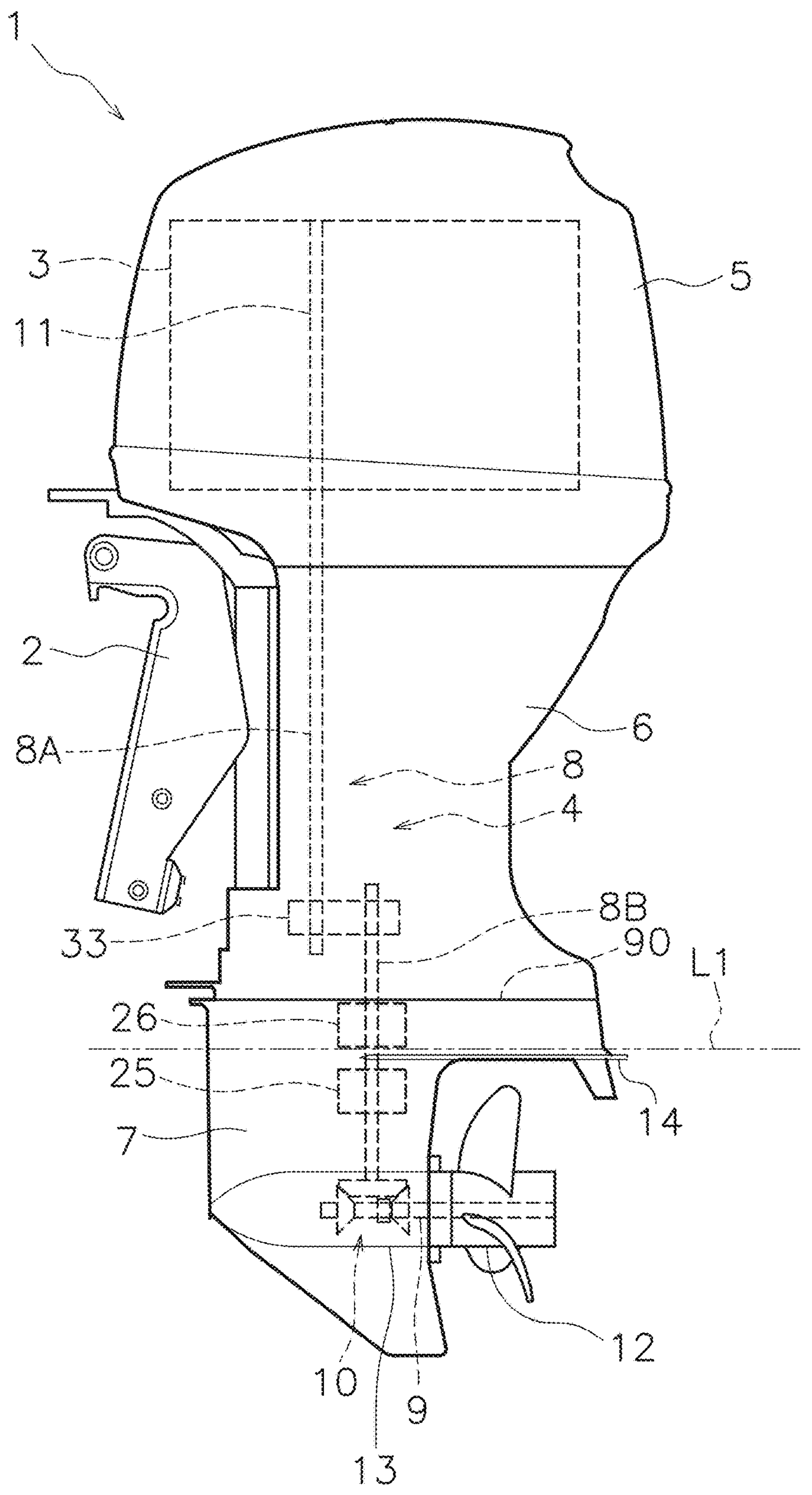
FIG. 15 is a side view of an outboard motor according to a fourteenth preferred embodiment of the present invention.
Figure 16:
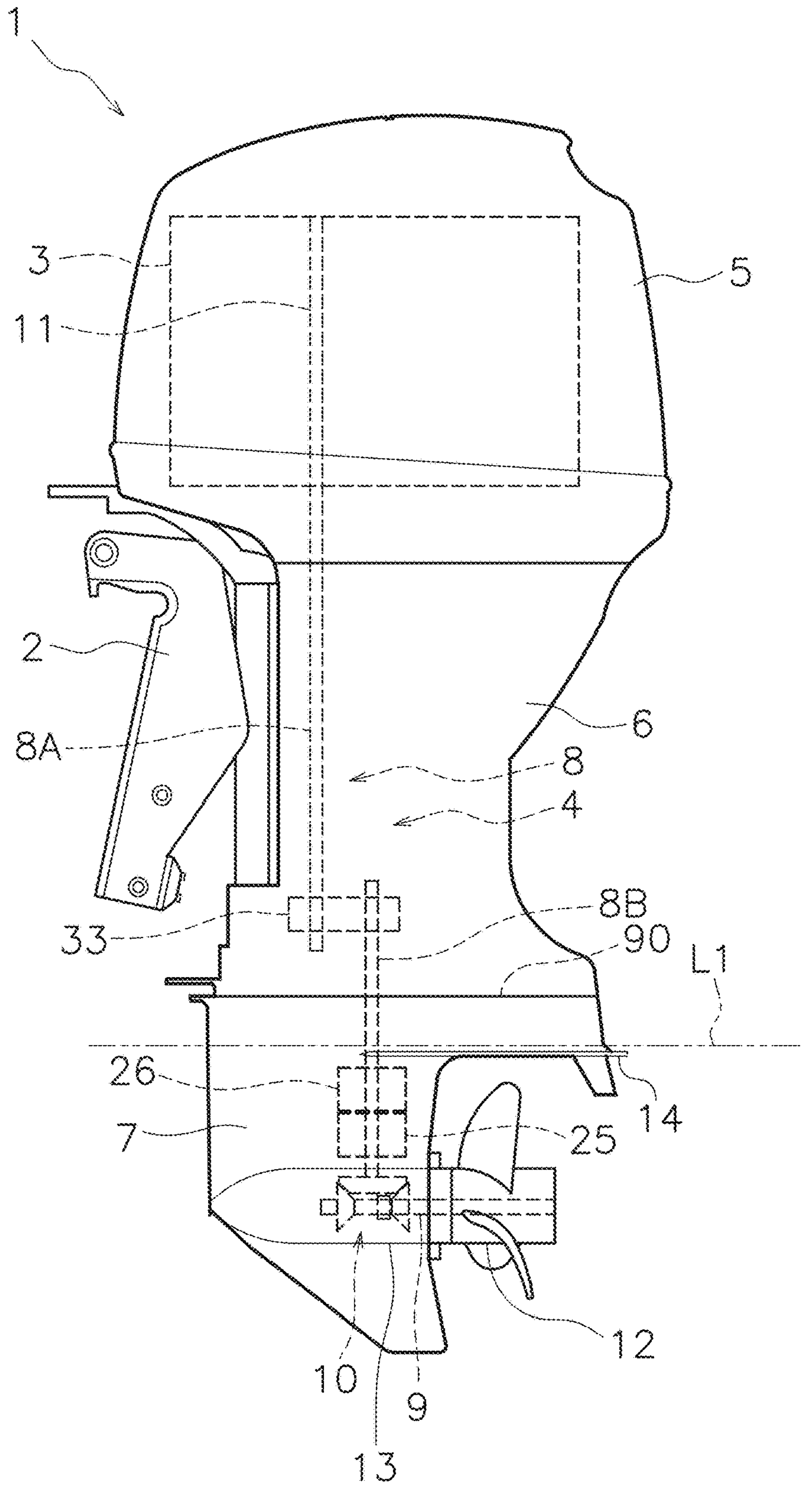
FIG. 16 is a side view of an outboard motor according to a fifteenth preferred embodiment of the present invention.
Figure 17:
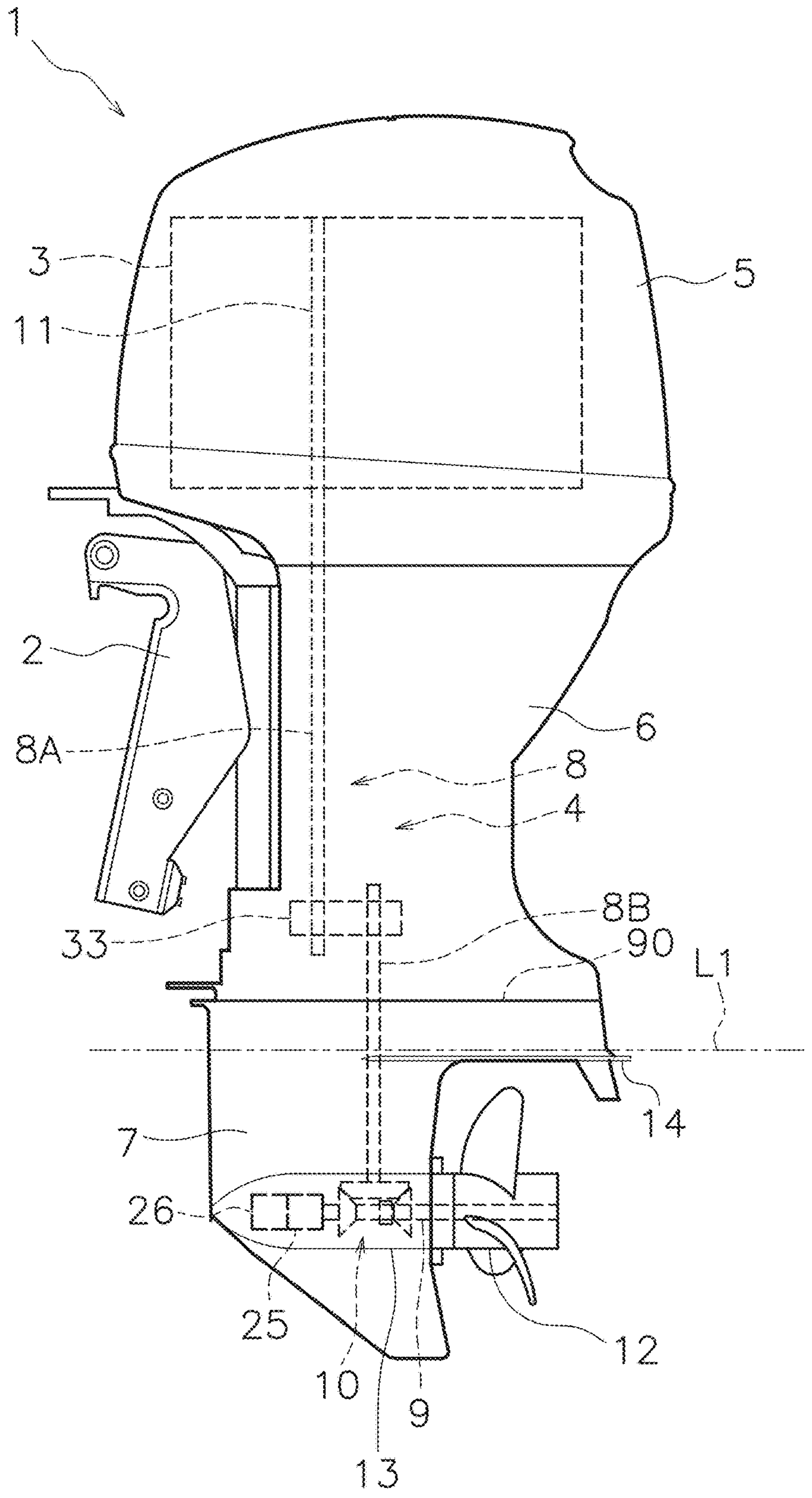
FIG. 17 is a side view of an outboard motor according to a sixteenth preferred embodiment of the present invention.
Figure 18:
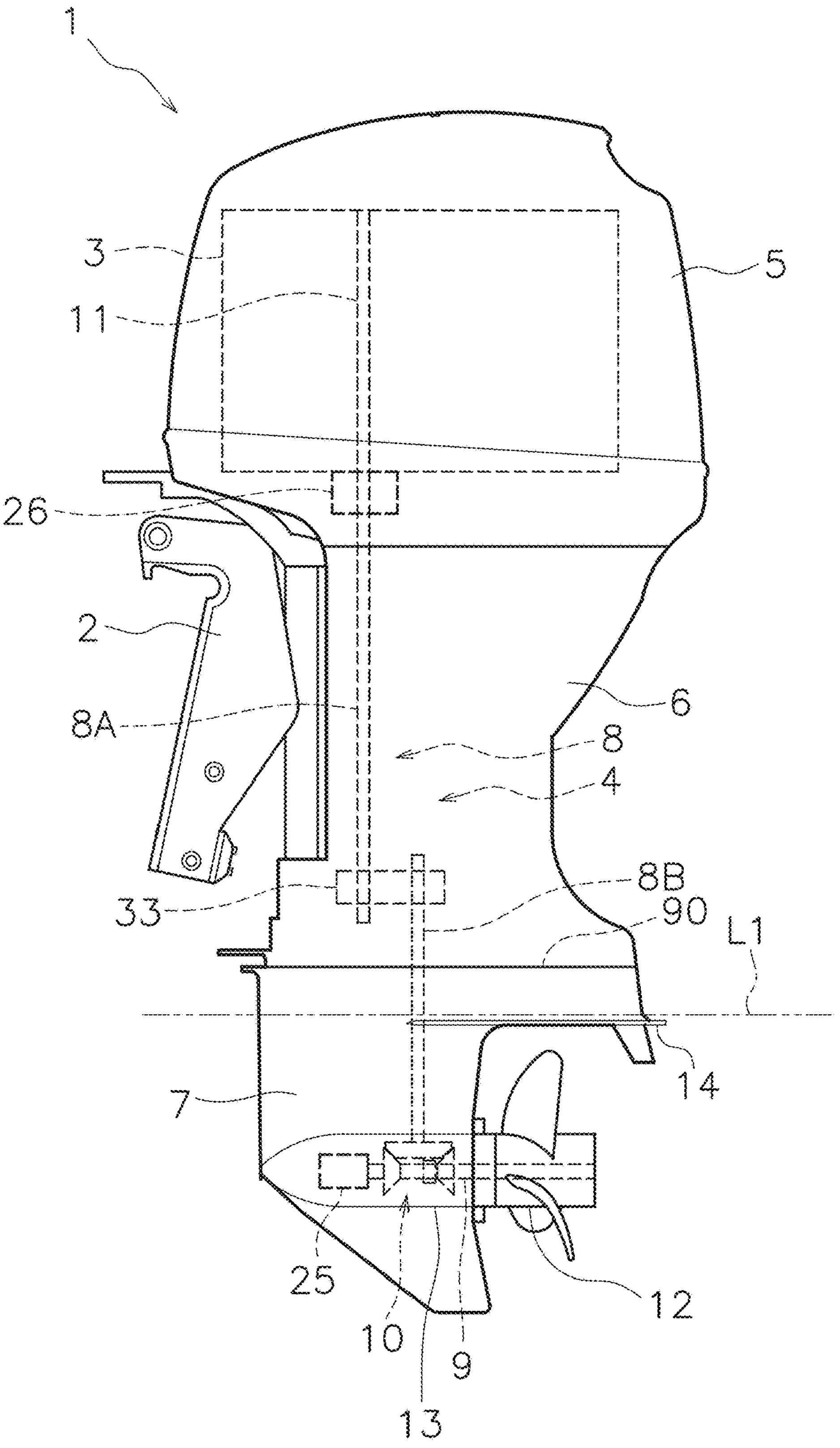
FIG. 18 is a side view of an outboard motor according to a seventeenth preferred embodiment of the present invention.
Figure 19:
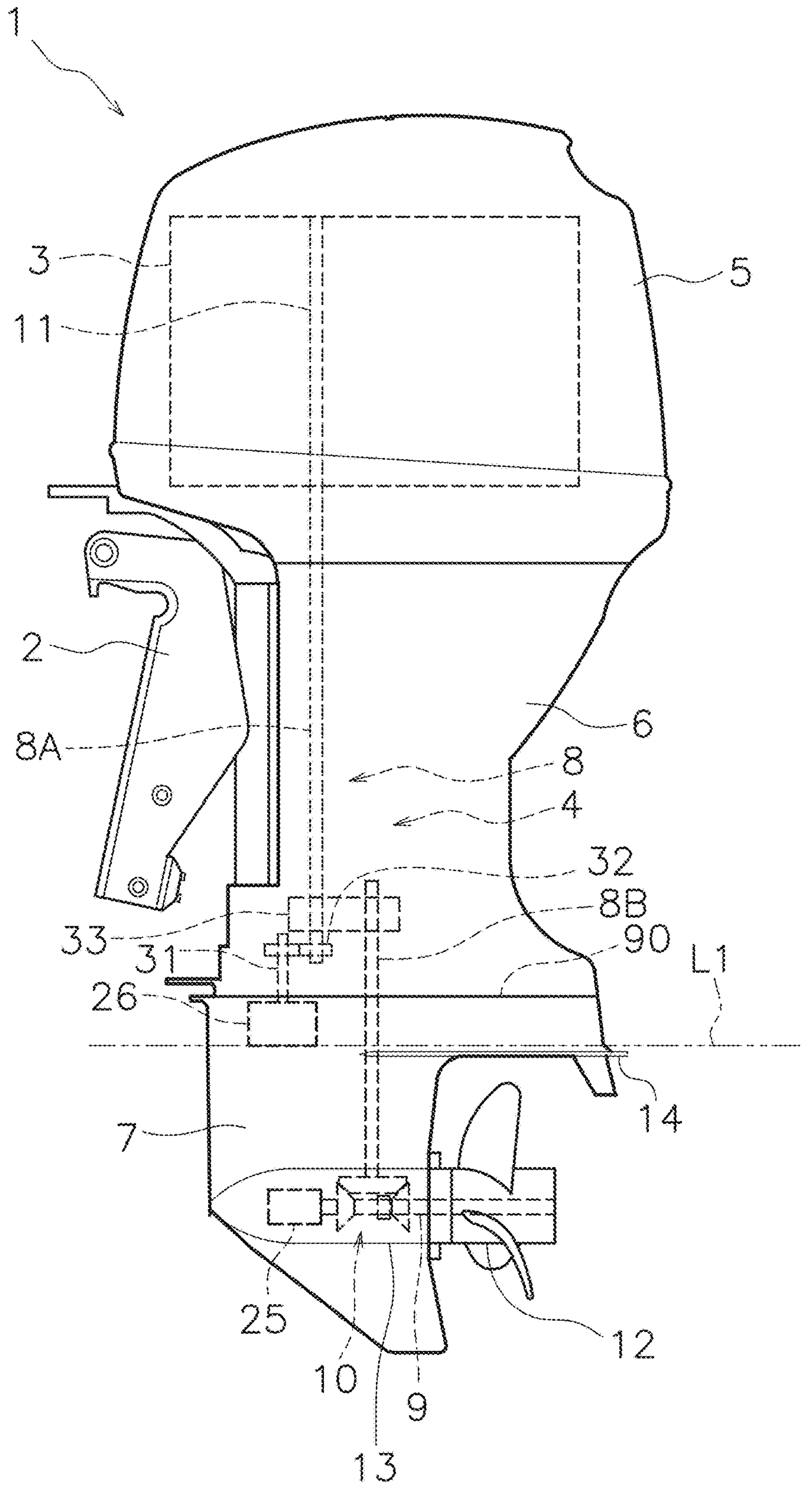
FIG. 19 is a side view of an outboard motor according to an eighteenth preferred embodiment of the present invention.
Figure 20:
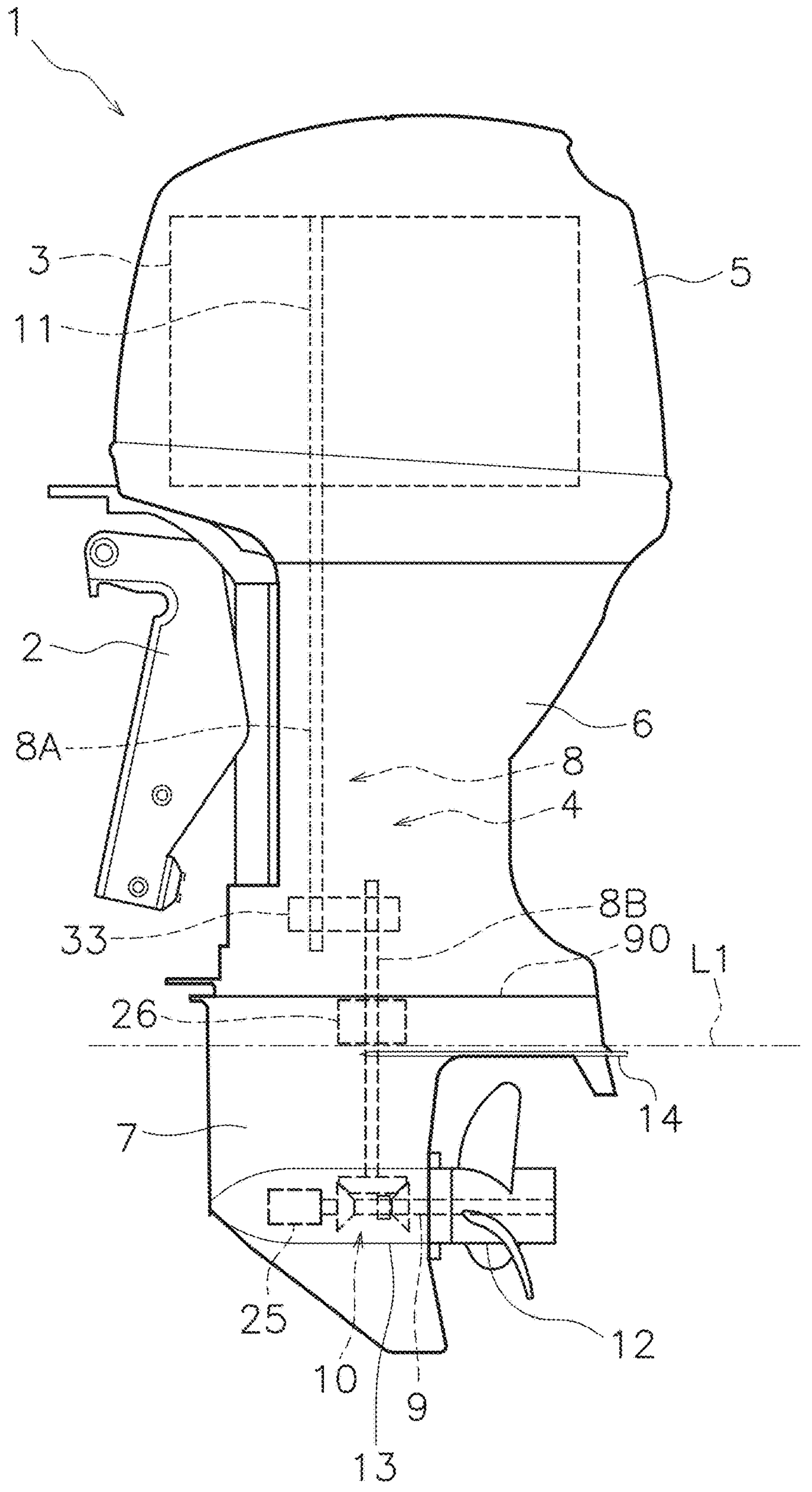
FIG. 20 is a side view of an outboard motor according to a nineteenth preferred embodiment of the present invention.
Figure 21:
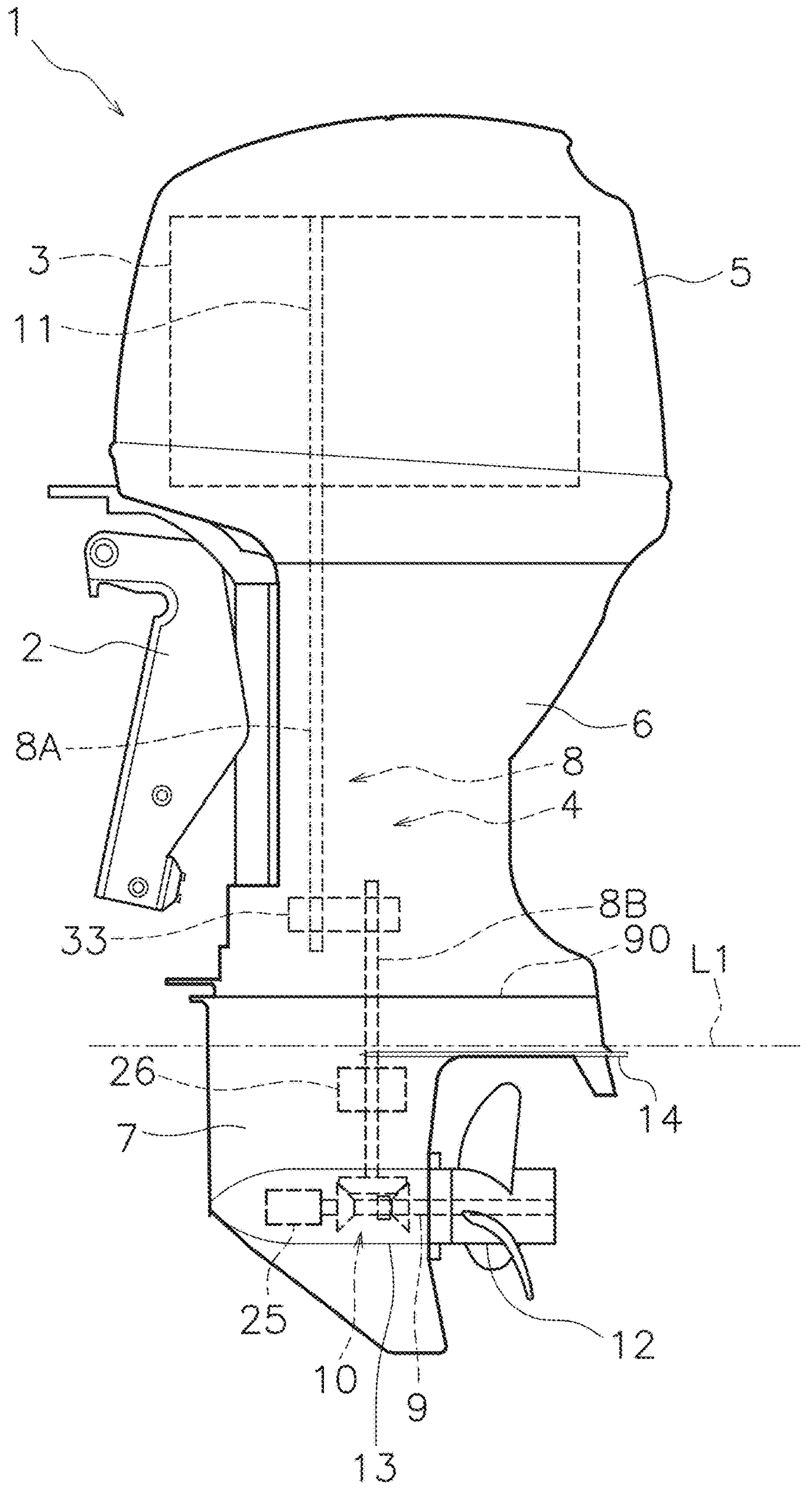
FIG. 21 is a side view of an outboard motor according to a twentieth preferred embodiment of the present invention.

In the outboard motor 1 according to the eleventh preferred embodiment, the first pump 25 is connected to the second drive shaft 8B. The second pump 26 is connected to the propeller shaft 9 as in the first preferred embodiment. Alternatively, the second pump 26 may be disposed the same as in the second to tenth preferred embodiments. FIG. 13 is a side view of the outboard motor 1 according to a twelfth preferred embodiment of the present invention. FIG. 14 is a side view of the outboard motor 1 according to a thirteenth preferred embodiment of the present invention. FIG. 15 is a side view of the outboard motor 1 according to a fourteenth preferred embodiment of the present invention. FIG. 16 is a side view of the outboard motor 1 according to a fifteenth preferred embodiment of the present invention. FIG. 17 is a side view of the outboard motor 1 according to a sixteenth preferred embodiment of the present invention. FIG. 18 is a side view of the outboard motor 1 according to a seventeenth preferred embodiment of the present invention. FIG. 19 is a side view of the outboard motor 1 according to an eighteenth preferred embodiment of the present invention. FIG. 20 is a side view of the outboard motor 1 according to a nineteenth preferred embodiment of the present invention. FIG. 21 is a side view of the outboard motor 1 according to a twentieth preferred embodiment of the present invention. The arrangement of the first pump 25 and the second pump 26 in the twelfth to twentieth preferred embodiments is the same as in the second to tenth preferred embodiments, respectively. As shown in FIGS. 13 to 21, the second pump 26 may be connected to the first drive shaft 8A or may be connected to the second drive shaft 8B.

In the first, fifth, sixth, tenth, eleventh, fifteenth, sixteenth, and twentieth preferred embodiments described above, the second pump 26 may be a non-positive displacement pump. That is, in the first, fifth, sixth, tenth, eleventh, fifteenth, sixteenth, and twentieth preferred embodiments, both the first pump 25 and the second pump 26 may be non-positive displacement pumps.

The configuration of the cooling water passage 16 is not limited to that of the above preferred embodiments, and may be modified. For example, the number of water intakes is not limited to one, and may be two or more. The first passage 22 and the second passage 23 may be connected to separate water intakes. The first passage 22 and the second passage 23 do not have to join downstream of the pumps 25 and 26. That is, the first passage 22 and the second passage 23 may be connected to the water jacket 15 of the engine 3 independently of each other.

The second pump 26 may send the cooling water to the first pump 25. For example, the second pump 26 may send the cooling water to the first pump 25 as a priming water to activate the first pump 25.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:

a bracket to mount the outboard motor to a watercraft;

an engine;

an upper case below the engine;

a lower case below the upper case;

a cavitation plate connected to the lower case;
a transmission including:
a drive shaft extending downward from the engine and located in the upper case and the lower case; and
a propeller shaft connected to the drive shaft, extending in a front-rear direction of the outboard motor, and located in the lower case;
a cooling water passage connected to the engine and located in the upper case and the lower case;
a first pump that is a non-positive displacement pump, located below a lower end of the bracket, connected to the transmission, and operable to send cooling water to the engine through the cooling water passage; and
a second pump that is a non-positive displacement pump, driven by a driving force from the transmission, and operable to send the cooling water to the engine through the cooling water passage.

2. The outboard motor according to claim 1, wherein the second pump is above the cavitation plate.

3. The outboard motor according to claim 2, wherein
the engine includes a crankshaft; and
the second pump is connected to the crankshaft.

4. The outboard motor according to claim 2, wherein
the transmission further includes an intermediate shaft offset from the drive shaft and connected to the drive shaft; and
the second pump is connected to the intermediate shaft.

5. The outboard motor according to claim 2, wherein the second pump is connected to the drive shaft.

6. The outboard motor according to claim 1, wherein the second pump is below the lower end of the bracket.

7. The outboard motor according to claim 6, wherein the second pump is connected to the drive shaft.

8. The outboard motor according to claim 6, wherein the second pump is connected to the propeller shaft.

9. The outboard motor according to claim 1, wherein the second pump is below the lower end of the bracket.

10. The outboard motor according to claim 9, wherein the second pump is connected to the drive shaft.

11. The outboard motor according to claim 9, wherein the second pump is connected to the propeller shaft.

12. The outboard motor according to claim 1, wherein the first pump is coaxial with the drive shaft.

13. The outboard motor according to claim 1, wherein the first pump is coaxial with the propeller shaft.

14. The outboard motor according to claim 1, wherein the second pump is coaxial with the drive shaft.

15. The outboard motor according to claim 1, wherein the second pump is coaxial with the propeller shaft.

16. The outboard motor according to claim 1, wherein
the first pump is connected to the propeller shaft;
the second pump is above the cavitation plate;
the engine includes a crankshaft; and
the second pump is connected to the crankshaft.

17. The outboard motor according to claim 1, wherein
the first pump is connected to the propeller shaft;
the second pump is above the cavitation plate;
the transmission further includes an intermediate shaft offset from the drive shaft and connected to the drive shaft; and
the second pump is connected to the intermediate shaft.

18. An outboard motor comprising:
a bracket to mount the outboard motor to a watercraft;
an engine;
an upper case below the engine;
a lower case below the upper case;
a cavitation plate connected to the lower case;
a transmission including:
a drive shaft extending downward from the engine and located in the upper case and the lower case; and
a propeller shaft connected to the drive shaft, extending in a front-rear direction of the outboard motor, and located in the lower case;
a cooling water passage connected to the engine and located in the upper case and the lower case;
a first pump that is a non-positive displacement pump, located below the cavitation plate, connected to the transmission, and operable to send cooling water to the engine through the cooling water passage; and
a second pump driven by a driving force from the transmission and operable to send the cooling water to the engine through the cooling water passage.

19. An outboard motor comprising:
a bracket to mount the outboard motor to a watercraft;
an engine;
an upper case below the engine;
a lower case below the upper case;
a cavitation plate connected to the lower case;
a transmission including:
a drive shaft extending downward from the engine and located in the upper case and the lower case; and
a propeller shaft connected to the drive shaft, extending in a front-rear direction of the outboard motor, and located in the lower case;
a cooling water passage connected to the engine and located in the upper case and the lower case;
a first pump that is a non-positive displacement pump, located in the lower case, connected to the transmission, and operable to send cooling water to the engine through the cooling water passage; and
a second pump driven by a driving force from the transmission and operable to send the cooling water to the engine through the cooling water passage.

20. An outboard motor comprising:
a bracket to mount the outboard motor to a watercraft;
an engine;
an upper case below the engine;
a lower case below the upper case;
a cavitation plate connected to the lower case;
a transmission including:
a drive shaft extending downward from the engine and located in the upper case and the lower case; and
a propeller shaft connected to the drive shaft, extending in a front-rear direction of the outboard motor, and located in the lower case;
a cooling water passage connected to the engine and located in the upper case and the lower case;
a first pump that is a non-positive displacement pump, located below a lower end of the bracket, connected to the transmission, and operable to send cooling water to the engine through the cooling water passage; and
a second pump located in the lower case, driven by a driving force from the transmission, and operable to send the cooling water to the engine through the cooling water passage.

* * * * *